United States Patent [19]
McFadden et al.

[11] 3,875,389
[45] Apr. 1, 1975

[54] METHOD AND APPARATUS FOR AUTOMATIC OPTIMAL LAYOUT OF SHAPES TO BE CUT FROM MATERIAL

[75] Inventors: Daniel G. McFadden, Parsippany; Richard C. Levine, Plainfield, both of N.J.

[73] Assignee: LeBoeuf, Lamb, Leiby & MacRae, New York, N.Y.

[22] Filed: Aug. 30, 1972

[21] Appl. No.: 284,879

[52] U.S. Cl............... 235/151, 33/11, 33/17, 235/151.11
[51] Int. Cl.............................................. G06g 7/48
[58] Field of Search ... 235/151, 150, 151.1, 151.11; 444/1; 340/172.5; 33/4–6, 11, 12, 17 R, 17 A; 83/32, 71

[56] References Cited
UNITED STATES PATENTS

| | | | |
|---|---|---|---|
| 3,242,573 | 3/1966 | Noel................................. | 83/71 UX |
| 3,246,550 | 4/1966 | Galey et al................. | 235/151.1 UX |
| 3,490,147 | 1/1970 | Brichard et al.......... | 235/151.1 UX |
| 3,490,320 | 1/1970 | Valembois et al.................. | 83/71 X |
| 3,596,068 | 7/1971 | Doyle................................. | 235/150 |

*Primary Examiner*—Joseph F. Ruggiero
*Attorney, Agent, or Firm*—Gerald J. Ferguson, Jr.; Joseph J. Baker

[57] ABSTRACT

The invention provides means for automatically orienting objects of described geometrical shape upon sheet material so that the utilization of the material is most efficient with a minimal amount of scrap. Various applications include the manufacture of garments from cloth, objects from sheet metal, and the like. The shape of the object is represented within the mechanism by signals representing the geometric coordinates of points on the contour involved. Automatic means provide signals representing a safe boundary or margin or web about the object including sharp corners thereof and orient adjacent parts for the closest and most efficient fit.

46 Claims, 14 Drawing Figures

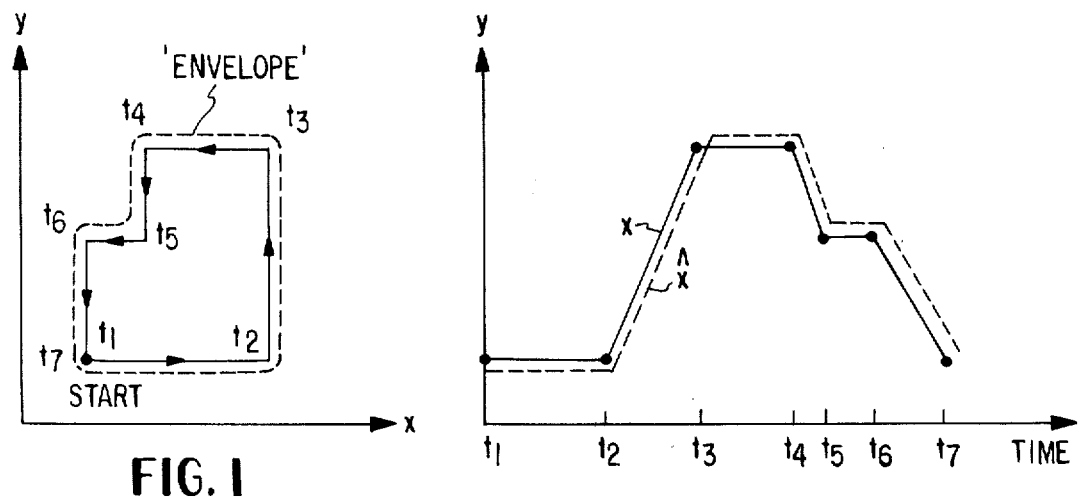
FIG. 1
FIG. 1B
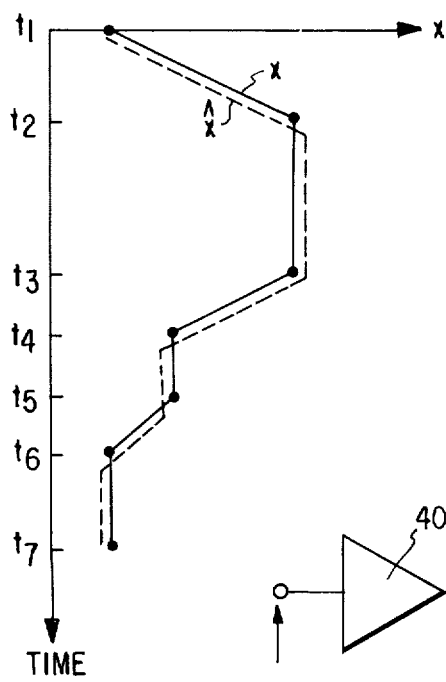
FIG. 1A
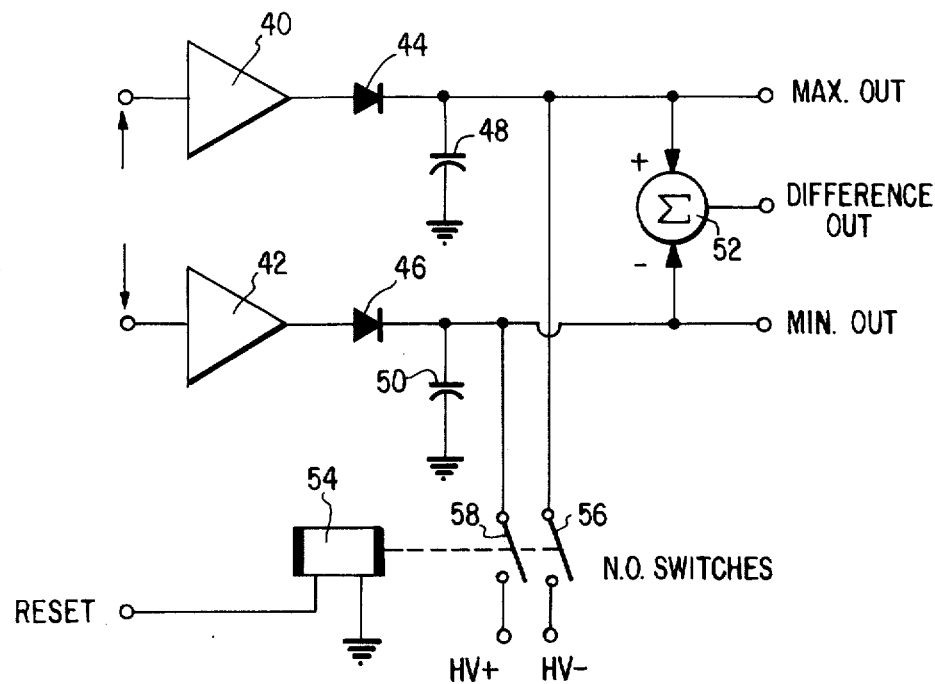
FIG. 4

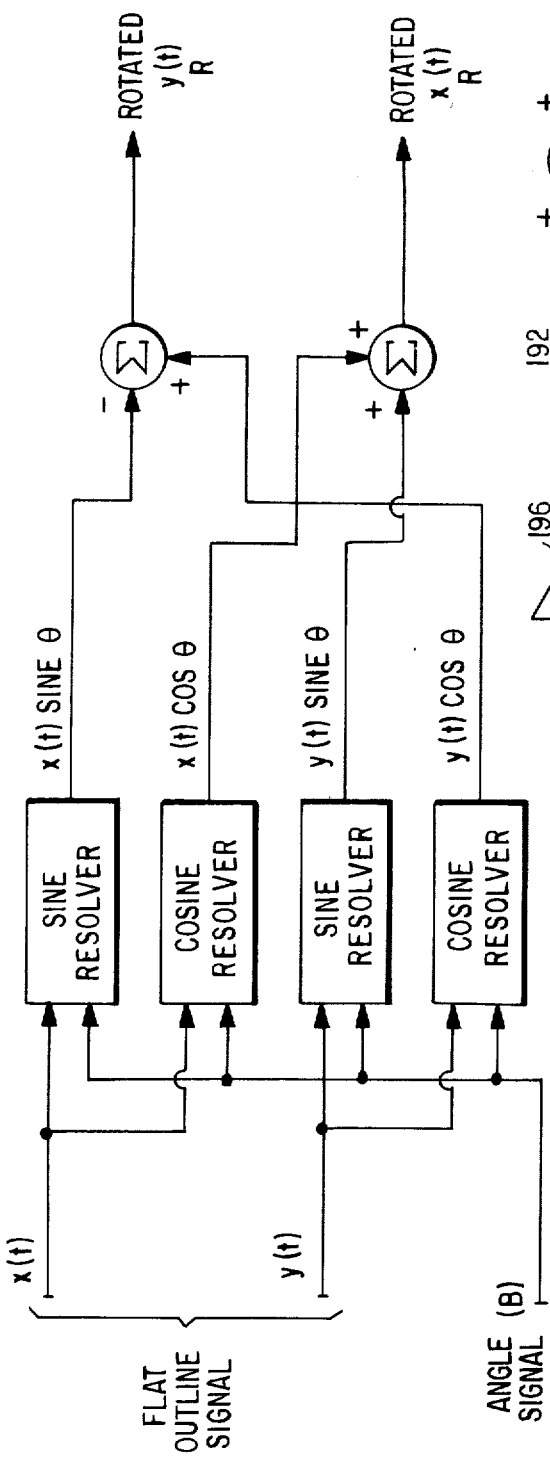
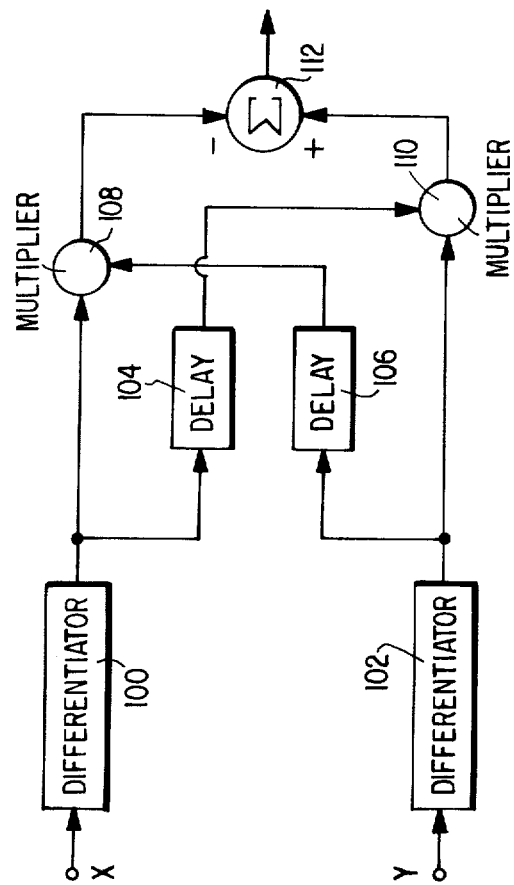
FIG. 3
FIG. 8
FIG. 10

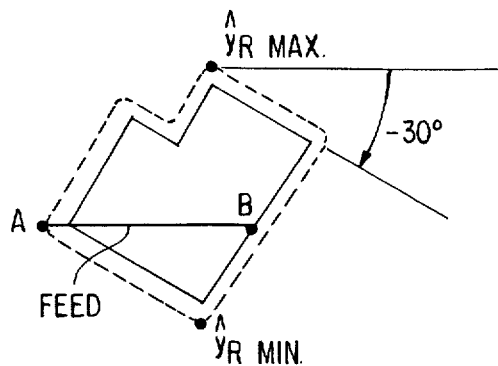
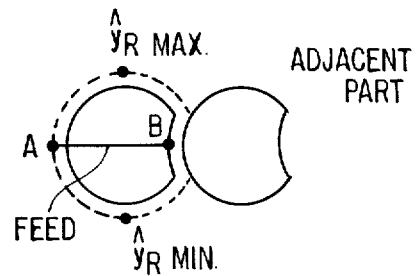
FIG. 6A  FIG. 6B
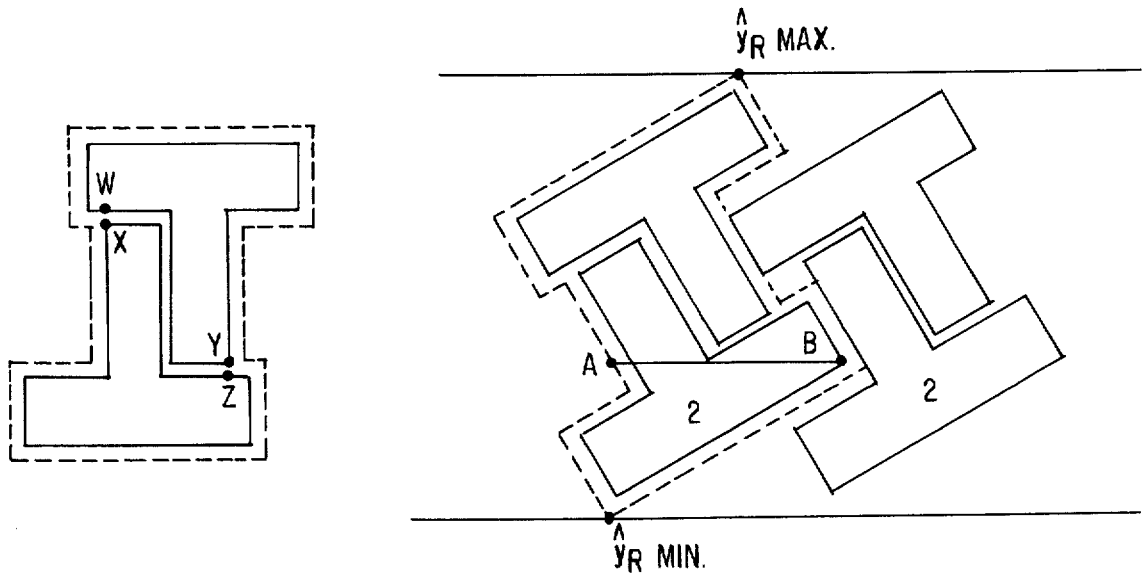
FIG. 7A  FIG. 7B

METHOD AND APPARATUS FOR AUTOMATIC OPTIMAL LAYOUT OF SHAPES TO BE CUT FROM MATERIAL

CROSS-REFERENCE TO RELATED APPLICATIONS

A method for obtaining an optimum orientation of a shape to be cut from material is disclosed and claimed in copending U.S. application Ser. No. 66,533 filed Aug. 24, 1970, which has been assigned to the assignee of the instant application.

BACKGROUND OF THE INVENTION

1. Field of the Invention

This invention relates to a method and apparatus for optimizing the orientation of objects to be cut from a sheet of material so that waste scrap is minimized.

2. Discussion of the Prior Art

The problem of optimal layout of objects to be cut from sheet material arises in many industries. One example is the manufacture of machine or mechanical parts from sheet metals, in which geometrical shapes are stamped or cut from sheet metal. Another example is the manufacture of garments from cloth in which many replicas of the same geometrically shaped part of a clothing pattern are to be cut from woven cloth material. There are also other applications in which parts are cut from paper, cardboard, plastic, and other sheet materials. With materials having high intrinsic cost, or those in which the value of the scrap is not high due to the cost of effective reprocessing for reuse, any method of producing an optimal layout with a minimum amount of scrap is of great economic value.

To date, in most industries, there is no definite method for the optimal layout of pieces on material. The layout that is used is entirely empirical in its derivation. Actual full size or scale size replicas of the desired objects are made of some sample rigid material, and manipulated by the hands of a skilled human operator until a result has been achieved which appears to be sufficiently good. In some cases, computer-aided layouts have been made in which a display screen shows the position of outlines representing the various objects, as well as a numerical display of the percentage of material utilized. The human operator gives directions to the computer showing how he wishes the individual objects to be rearranged, and he then observes the resultant efficiency of material utilization. He continues this process until he has what he feels to be a satisfactory solution.

Scientifically speaking, it is known that the general problem of optimal layout for minimum scrap is one of great commplexity. It is further known that there may be many nonunique solutions to a layout problem for certain given shapes of objects. In addition, when many objects are to be arranged on a piece of material, the position and angular orientation of each object must be optimized simultaneously to produce a correct result. In general, three variables must be specified for each object, namely the horizontal and vertical coordinates of the object, and its angle with respect to some reference direction. The horizontal, vertical and angular coordinates of one object may be taken as reference values. Therefore, even in the relatively simple task of placing three objects, six quantities must be simultaneously adjusted for optimal results.

Reference should be made to the following IBM New York Scientific Center Reports for more detailed discussions of the optimal layout problem: Report No. 320-2006, "An Approach to the Two Dimensional, Irregular Cutting Stock Problem" by R. C. Art, Jr., September, 1966, Report No. 320-2921, "Marker Layout Problem Via Graph Theory" by Okan Gurel, January, 1968; and Report No. 320-2965, "Circular Graph of Marker Layout" by Okan Gurel, February, 1969. Reference should also be made to the references cited in these reports.

This invention addresses itself primarily to a case in which two objects of identical shape are to be oriented on sheet material for the maximum utilization of the material and the minimum amount of useless scrap. Although the description is given with regard to only two objects, this covers a situation of wide spread industrial importance, since the two objects are the beginning of a chain of indefinite length representative of the structure occurring when a part is cut or blanked from a long ribbon or strip of material, as is done in industrial sheet metal blanking operations, or the manufacture of many types of identical parts from leather, plastic, cloth, and other materials. In addition, other more general cases can be approached by first finding optimal arrangement of pairs of objects, and then arranging the pairs into larger groups.

SUMMARY OF THE INVENTION

A particular object of this invention is to automatically introduce a safety boundary or web, between the two adjacent parts, which is of differing significance in different industrial applications. One such situation occurs in the manufacture of parts from sheet metal, in which the web or space of scrap material between the two parts is necessary to hold the skeleton of sheet metal scrap together so that it may be safely and effectively carried out of the press mechanism which blanks out the useful parts. Another reason for a web between parts occurs in the garment field, where a seam allowance is required all around the edge of a part of a clothing pattern. A third industrial requirement for a web around the outline of a part occurs in situations where the edge of the material is deformed or compressed slightly due to the cutting or blanking operation, and a certain amount of space is necessary between parts so that the edge of an adjacent part will not be influenced by the deformations in shape of the adjacent part.

A further object of this invention is to produce a layout of optimal efficiency in the utilization of the sheet material, which is produced with greater speed and accuracy than can be achieved through the best experience and judgment of a human technician utilizing scale models.

Another object of this invention is to produce the resultant description of the part layout in a form which is compatible with electronic machinery for the purpose of displaying the pictorial shape of the result on a cathode ray tube screen, or producing signals which can be used to operate suitable machinery for actually cutting the objects from the material, or digital signals for controlling various machine tools to either cut or form the parts, or through further processing to make the tools for this purpose.

BRIEF DESCRIPTION OF THE DRAWING

FIG. 1 is a pictorial diagram of an illustrative piecepart, the outline of which is scanned in a predetermined direction.

FIGS. 1A and 1B are graphs of waveforms resulting from the scan illustrated in FIG. 1.

FIG. 3 is a block diagram of illustrative circuitry for rotating an outline signal through a predetermined angle of rotation.

FIG. 4 is a schematic diagram of illustrative circuitry for storing maximum and minimum values of a waveform and their difference.

FIGS. 6A and 6B are pictorial representations illustrating the height and feed.

FIGS. 7A and 7B are pictorial representations illustrating "alternate feed" or "two at a time."

FIG. 8 is a block diagram of illustrative circuitry for detecting an external corner in a part contour.

FIG. 10 is a block diagram of illustrative circuitry for generating a cosinusoidal wave of predetermined initial amplitude, maximum amplitude, and frequency.

DESCRIPTION OF THE PREFERRED EMBODIMENTS

A preferred embodiment of this invention is one in which signals representing the geometric horizontal and vertical coordinates are processed through the mechanism to be described. In general, such signals would be electrical signals, of either an analogue or digital form. However, it is well known that equivalent mechanisms utilizing hydraulic signals, fluidic signals, and other methods could adequately achieve the same result. For the purpose of description, it is assumed that the original description of the part, taken either from a drawing on paper, or from a table of numbers, has been converted into two waveforms, designated X and Y. Circuitry for effecting this is well known to those of ordinary skill in this art and is described in the beforementioned application Ser. No. 66,533, which is incorporated herein by reference. These represent the instantaneous coordinates of a point traversing the contour describing the outline of the part, and they both vary in voltage as a function of time. As a specific illustration, it is assumed that the point traverses the outline in a generally counter-clockwise direction. Such a curve is shown in FIG. 1, together with the two waveforms applicable to the description of the point traversing the contour as indicated in FIGS. 1A and 1B.

The two signals are processed through two major operations. The first is through the circuitry shown in FIG. 2 which has the purpose of generating a new pair of signals, called the "envelope" signals, and designated by the characters $\hat{X}$ and $\hat{Y}$ and shown in FIGS. 1, 1A and 1B in dotted lines. The second major process is the "rotation" of the envelope and the original outline signals to obtain an orientation of optimal efficiency in utilization of the material as shown in FIGS. 3 through 6.

With regard to FIG. 2, the overall structure has the effect of processing the input X and Y signals so as to produce the output signals, $\hat{X}$ and $\hat{Y}$, which represent a contour which is larger (or, in general, different) than the original contour by an amount controlled by a parameter set within the mechanism, as will be explained in more detail hereinafter.

Figure 2:
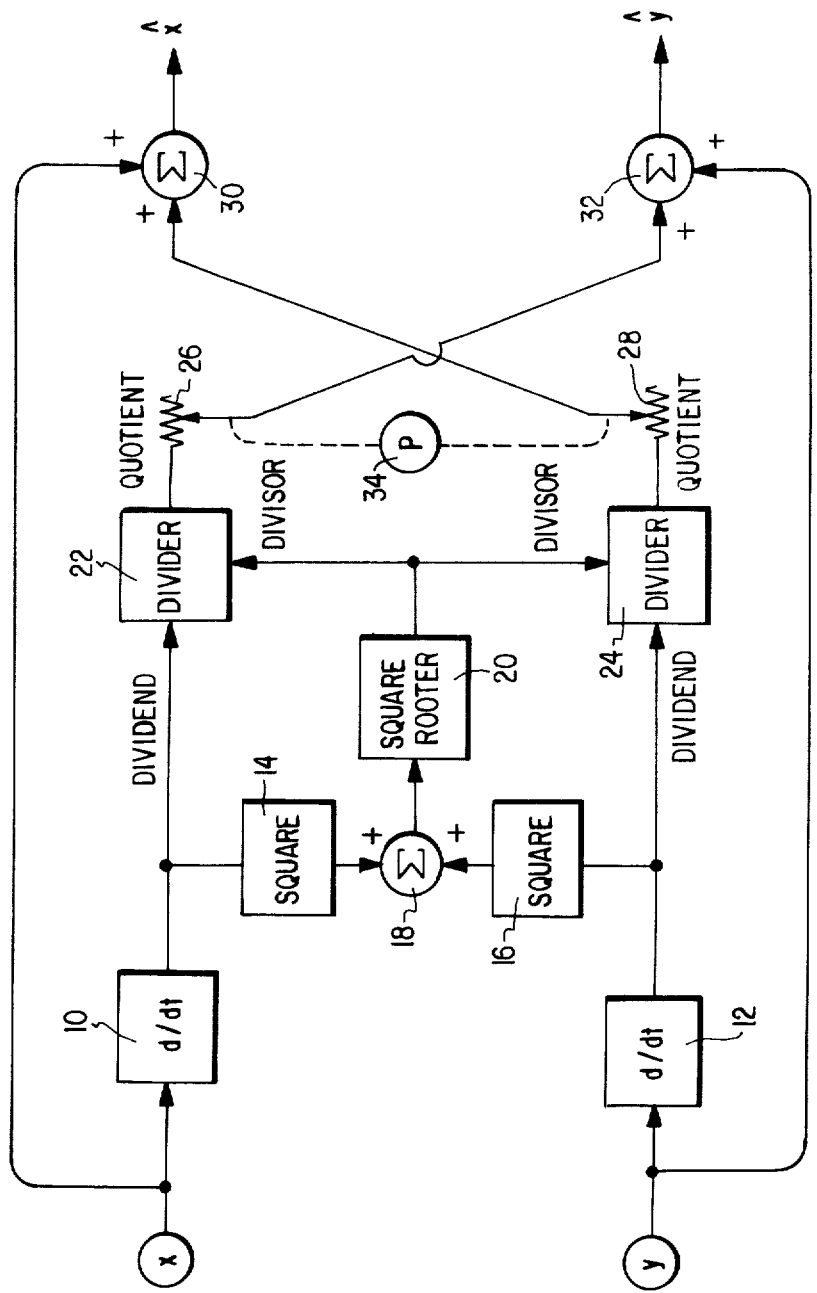
FIG. 2 is a block diagram of an illustrative embodiment of circuitry for generating an "envelop" signal.

The operation of the circuitry of FIG. 2 is as follows. To the input are applied the two signals, X and Y. The signals are first differentiated by circuits 10 and 12 respectively to obtain signals equal to the time derivative of the original signal in each case. These signals are respectively squared by squaring circuits 14 and 16. The sum of these signals is then formed in a summer circuit 18, and the square root is taken in circuit 20. The result of these operations is a signal which is fed to two similar dividing circuits 22 and 24, in which the original time derivative signal is divided by the resultant signal of the squaring, summation, and square root process. These quotient signals emerging from the dividing circuits are scaled in magnitude by scaling circuits which are represented by potentiometers 26 and 28. The signals emerging from potentiometers 26 and 28 are respectively cross-coupled to summing circuits 30 and 32 where they are respectively added to the original coordinate signal of the other type. Thus, the scaled signal emerging from potentiometer 26 is added in summer 32 to the Y signal, and the resultant signal, $\hat{Y}$, has been offset by an amount related to the setting of the potentiometer 26. The setting of the potentiometers is controlled by a mechanism 34 which can be either mechanical or electronic so that the setting of each potentiometer is the same for all scaled values. If the scaling of the voltages in the signals representing the coordinates in this mechanism is such that one volt is proportional to one inch of coordinate, then the output signals, $\hat{X}$ and $\hat{Y}$, will trace an envelop contour which is one inch larger all around than the original contour described by the input signals, X and Y. Thus, the amount by which the envelop is larger than the original contour is determined by the setting of the potentiometers 26 and 28.

The circuit elements 14, 16, 18, 20, 22 and 24 are in general necessary; however, if the scanning rate tangential to the contour is constant on all parts of the outline (and this can be effected, if necessary), the above circuit elements can be eliminated.

In many cases a special treatment of sharp corners in the part outline is necessary. It is desirable to replace the sharp corners in a part contour by a suitable radius chosen so that the envelop signal eventually produced will be a smoothly joined contour which will be an equal distance from the nearest point on the part contour at all places. A radius is chosen so that sharp, external corners are replaced by an extremely small radius; and sharp, internal corners are replaced by a radius which is equal to the desired width of the envelop band. Only the process for replacing an external corner will be described in detail since the process for replacing an external corner is almost identical in structure with only the polarity and magnitude of certain signals changed slightly.

The presence of an external corner can be detected by processing a signal descriptive of the curvature of the outline. This signal can be generated from the X and Y coordinate signals by a circuit as shown in FIG. 8. This circuit consists of differentiators 100 and 102, delay lines 104 and 106, multipliers 108 and 110 and a summing circuit 112 to take the difference of the multiplier output signals. The action of this "Curvature" Detector is such that the output will be zero in portions of the outline which are perfectly straight and positive and proportional to the sharpness of curvature in any region where there is an external bend or arc in the contour. That is, the positive signal corresponds to a situation in which the outline is curving to the left as one walks along in a counter-clockwise direction. The delay time of each of the two delay lines 104 and 106 is chosen to be at least as long as the shortest time required to traverse a sharp corner as expected by the particular data to be used.

Figure 9:
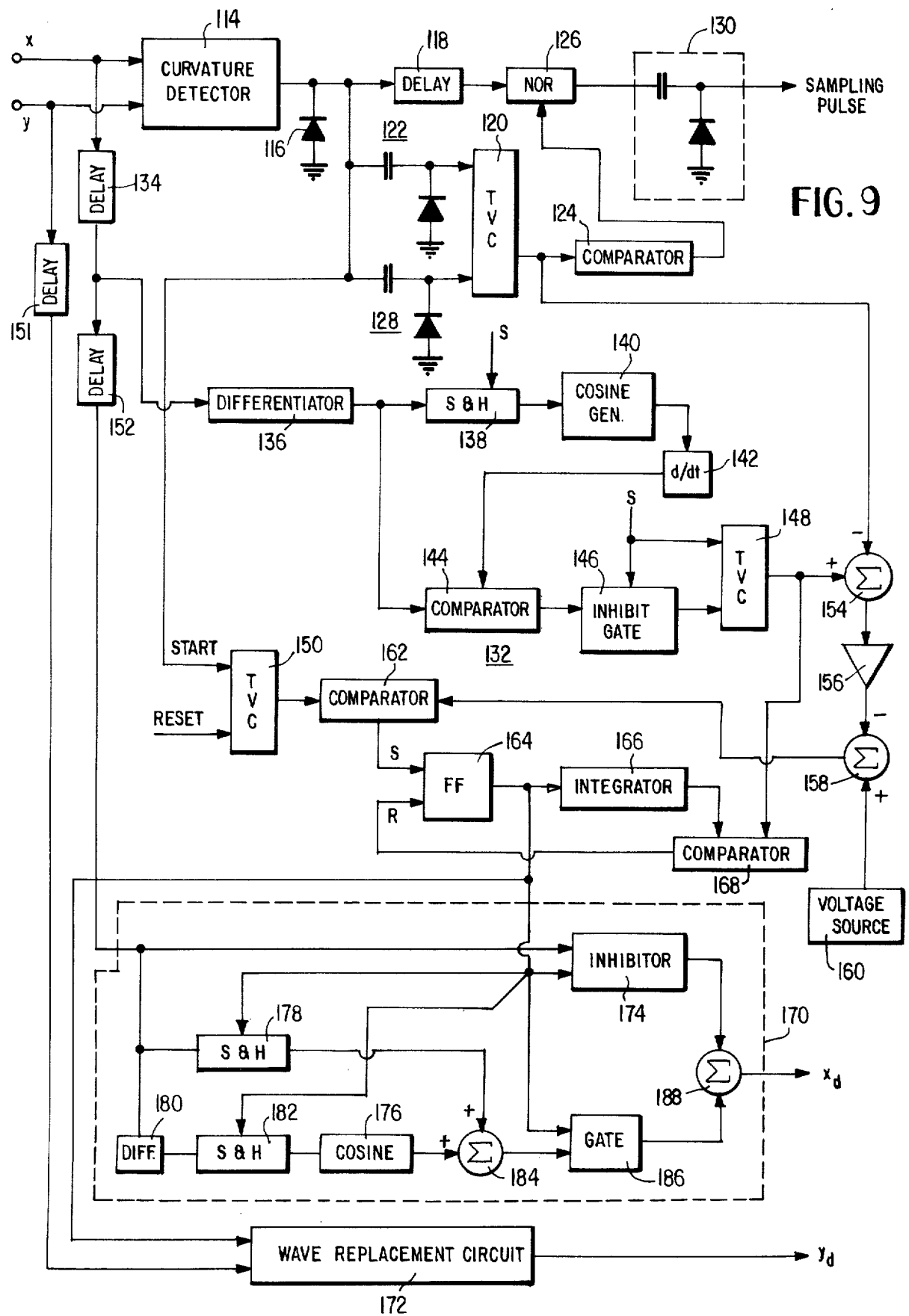
FIG. 9 is a block diagram of illustrative circuitry for replacing sharp external corners in a part contour with cosine waveforms.

A block diagram of illustrative circuitry for preprocessing the X and Y coordinate signals to replace the sharp corners with a smooth curvature is shown in FIG. 9. The circuitry of FIG. 9 is disposed prior to the circuitry of FIG. 2 and applies its output to the FIG. 2 circuitry. In the absence of any curvature of the outline, the flow of the signals X and Y is not processed by the FIG. 9 circuitry but merely passes through a total delay of T seconds and emerges with no effect other than the delay itself. Whenever the curvature signal is present, it is processed to insure that it is not too long in duration. If it is too long, this indicates that a sharp corner is not present. If a sharp corner is present, a blending cosine signal is generated which represents the projection of an arc-shaped signal. This blending signal is applied for an adequate time to bridge over the original sharp corner. This amount of time is recorded and used to generate a suitable cosine signal in the delayed waveforms for X and Y. These cosine signals represent the projections of a circle or arc and thus, they bridge over what was originally a sharp corner on the part outline.

The curvature signal is detected by a curvature detector 114, which is as shown in FIG. 8, and is clamped by a diode 116 to insure that only positive values will be detected. The signal is then sent through a delay line 118. Also, it is applied to a time to voltage converter (TVC) 120 through a differentiator 122. The time to voltage converter 120 is typically a set-reset, flip-flop whose output is integrated to produce a ramp. This is a widely used device and is not described in further detail.

The leading and trailing edges of the curvature signal are used to start and stop the time voltage converter 120. If the voltage appearing at the output of the time voltage converter 120 is greater than a threshold, which has been preset at a comparator 124, an inhibiting signal emerges from the comparator 128 to inhibit the actual delayed curvature signal at the NOR gate 126. The delay of delay line 118 is chosen to be greater than the minimum desired curvature signal duration. If the curvature signal is sufficiently short in duration, it is not inhibited by the NOR gate 126 inasmuch as the amount of time required for the ramp output of TVC 120 to reach the threshold of comparator 124 is substantially equal to the delay of delay line 118. That is, the trailing edge of the curvature signal will stop the ramp prior to its reaching the threshold, the trailing edge being applied to differentiator 128 to stop TVC 120. The front edge of the output signal from NOR gate 126 is enhanced by a differentiator 130 and clamp to produce a sampling pulse, labeled S, which is used at several places in the rest of the system. In addition, the beginning of the curvature signal itself is used to start another timer generally indicated at 132 for purposes of counting the time until the delayed curvature signal is utilized. A duration signal, indicating the length of the curvature pulse, is also used elsewhere in the circuit.

The processing of the X coordinate signal is illustrated in detail in FIG. 9, although the Y signal could equally well have been chosen, since either one is suitable in this application. To determine the proper duration of time over which to replace the original signal by a cosine wave, the X signal is delayed by a delay line 134 for an amount of time equal to the delay of the delay lines 104 or 106 and delay line 118 respectively associated with the curvature detector 114 and NOR gate 126. The signal thus delayed is differentiated by differentiator 136 and sampled by a sample and hold circuit 138, which is triggered by the sampling pulse, S. The constant signal representing the slope of the X signal at the instant of sampling is fed to a cosine generator 140, which generates a cosine signal having an initial slope the same as that of the X signal at the instant of sampling. The amplitude and frequency of the cosine generator have been preset to give the projection of an arc of desired radius. The cosine generator will be described in more detail hereinafter in connection with FIG. 10. The derivative of the generated cosine signal is taken at differentiator 142 and compared with the derivative of the X signal at comparator 144 which puts out a pulse when the two are equal. Since the two signals are, of course, equal at the instant of the sampling, S, an inhibiting gate 146, to which is applied sample pulse, S, is used to avoid a false signal at that time since what is needed is the duration of time corresponding to those points where the slope of the X signal bridges smoothly with the slope at the leading and trailing edges of the replacement cosine signal. A time to voltage converter 148 is triggered by the sampling pulse, S, and stopped by the signal from the comparator 144. the voltage signal produced by time to voltage converter 144 when it is stopped is proportional to the time duration required for replacing the original outline signal by the portion of the cosine wave. This signal is used both in calculating the correct instant to switch over from the original outline to the cosine and is also used to produce the correct duration of the switch over.

At the instant that curvature is detected by detector 114, a time voltage comparator 150 is started and it acts as a clock. The total duration of the delay of the signal from input to output is designated by T. For the Y channel this delay is achieved through a single delay line 151 having appropriate delay, T. In the X channel a supplementary delay line 152 is cascaded after delay line 134, and the delay is chosen so that the sum of the two delay lines 134 and 152 is equal to the total duration, T, of the other channel.

The correct instant of switch-over is determined by first taking the difference at summer 154 between the duration of the replacement signal produced by the cosine generator and the duration of the original region of curvature. The duration of the original region of curvature is proportional to the output of TVC 120 when it is stopped. In general, the duration of the cosine wave is longer than that of the original curvature. Half of the above difference is the amount of time by which switch-over must occur to cosine waveform before the occurrence of the original region of curvature in the delayed waveform. Therefore, an amplifier 156 scales the difference signal from summer 154 by a factor of one-half. This, in turn, is subtracted at summer 158 from a constant voltage, the magnitude of which is proportional to the value of the total delay, T. The constant voltage is supplied by source 160.

The actual time from the instant curvature is detected, which is accumulated by the time to voltage converter 150, is compared with the signal from summer 158 in a comparator 162 which causes an output pulse at the instant that the two are equal, which corresponds to the instant of time replacement of the cosine wave should commence. At that instant, the output signal from comparator 162 causes a pulse to be produced by flip-flop 164. The SET output from flip-flop 164 is integrated by an integrator 166 and then applied to a comparator 168. The output signal from TVC 148 is also applied to comparator 168. The output from comparator 168 is applied to the RESET input of flip-flop 164 and the SET output thereof is applied to a cosine wave replacement circuit generally indicated at 170. Thus, a pulse is produced at the SET output of flip-flop 164 having a duration equal to the duration required for the cosine wave as measured by the output of the time to voltage converter 148.

This rectangular pulse on the SET output line causes two identical circuits 170 and 172 in both the X and Y channels to (1) switch off the incoming delayed waveform which is applied to an inhibiting gate 174 and (2) start a cosine generator 176, which is the same as that shown in FIG. 10 and which will produce a waveform with the duration of the one-shot signal having an appropriate slope and amplitude so as to join smoothly with the incoming waveform both before and after the action of flip-flop 164. This is achieved by sampling (1) the amplitude at sample and hold circuit 178 and (2) the slope of the incoming signal at differentiator 180 and sample and hold circuit 182 at the instant the SET pulse begins and using the sampled amplitude and slope to set the level and slope of the replacement cosine wave which is generated during the duration.

The emerging signals $X_D$ and $Y_D$ from circuits 170 and 172 will thus contain a replacement of the original sharp corner by a smooth connection consisting of an appropriate sine or cosine wave replacing the region of the corner in each of the two waveforms. This effected by providing the replacement wave with an initial amplitude at a summer 184, the replacement wave being gated through gate 186 to summer 188. If no replacement is effected, the inhibitor 174 is inoperative to pass the original X waveform to the output. This waveform can then be processed by the other apparatus disclosed herein, and the effect of any adjustment in the size of the object will merely be to increase or decrease the radius of the arc which replaces the original sharp corner. The problem which might arise due to the presence of sharp corners on the waveforms, and the consequent high values of the time derivative in circuitry of FIG. 2, are thus removed.

FIg. 10 describes in detail the circuitry of the cosinusoidal wave generators 140 to 176 which are used to generate a waveform which will match the input waveform in slope at the instant of joining. This circuitry is operated by providing a step signal at the input 190 having an amplitude proportional to the desired slope. This signal is processed through two channels generally indicated at 192 and 194. In channel 192 the signal is multiplied by a constant value, W, by an amplifier 196, which is preset to the desired angular frequency of the cosinusoidal waveform. In the second channel 194 the signal is multiplied by itself at multiplier 198 to produce the square of the signal, and this squared signal is subtracted at summer 200 from a constant signal, $R^2$, provided by source 202, which is preset to the value of the square of the desired amplitude, R, of the cosine wave. This corresponds geometrically to the square of the radius of the desired arc. The resulting signal is processed through a square rooting circuit 204. The output of circuit 204 sets the amplitude used in one of the summers 206 and 208 in a loop of integrators 210 and 212, and it is also subtracted at summer 214 from the output signal from the loop so that the waveform will begin at a value of zero initially. The signal from amplifier 196 is applied to integrator 206 to set the slope of the cosine signal. The integrator loop contains the two integrators 210 and 216 and an amplifier 216 having a negative gain equal to the square of W, the desired angular frequency. It is well known in the analogue computer art that such a structure will produce a cosinusoidal wave, of frequency W, and the amplitude and slope of this waveform will be produced by the constant initial levels fed to the inputs of the two integrators, 208 and 206 respectively, from the circuits 204 and 196.

The circuitry of FIG. 2 is shown in a form which will always lead to an output signal describing a contour which is larger than the contour described by the input signal. However, if the output summing circuits 30 and 32 are adjusted to take the difference of the two signals fed to them, more particularly, if the signal emerging frm the potentiometer 26 or 28 is subtracted from the original coordinate signal of the other coordinate, the resulting contour will be smaller than the original contour. Several industrially important applications arise for the generation of a contour which is uniformly smaller than an original contour, as in this case. One of these is the description of the shape of a punch to pierce this desired contour from sheet metal or other material, since it is necessary to maintain a specific, though small, clearance between a punch and a die cavity in blanking a part from sheet material in order to obtain the best performance. Another situation is in the extrusion of plastic or metal through an opening with a given cross-sectional shape. In general, after the plastic has hardened, or the metal has cooled, the final dimensions of the extruded part will be slightly smaller all around due to the effects of the evaporation of the solvent in the plastic or the thermal expansive effects in the metal, respectively.

The remainder of the process of this invention, after the generation of the envelope signal, consists of the processing of the outline signals to determine the orientation for optimal utilization of the material. To explain the entire system, it is helpful to consider first, two subportions of the overall system, which are made up of standard circuit components and devices, and are used at several points in the overall system.

One of these is a circuit for processing signals to represent the effect of rotating a contour in the plane through a given angle. A circuit of this kind is shown in FIG. 3, in which sine and cosine resolver circuits are used to scale the X and Y signals representing the trace of the outline. Circuits of this nature are widely used in analogue computer and radar systems, and, in fact, one of this nature is described fully in beforementioned copending application Ser. No. 66,533, and therefore, a detailed description will not be repeated in this application. As will be appreciated from the description in the above application, when a signal, the magnitude of which represent a given angle of rotation ($\theta$ in FIG. 3), is applied to the proper input, the output signals from the two rotated ports of this circuit will represent the effect of the original input signal rotated through the desired angle in the plane.

Further circuitry, which is used extensively in determining the maximum and minimum values of various signals throughout the process, as well as the difference between the respective maximum and minimum values, is shown in FIG. 4. The basic operation of the circuit is achieved by charging a capacitor through a diode of such polarity that the voltage will reach either a maximum or minimum value. Taking the upper circuit of FIG. 4 as an example, the voltage of the input signal will cause a charging of the upper capacitor 48 whenever it increases, but should it drop below a previous maximum value, the diode 44 through which current flows will become back-biased, and no discharging will occur. The capacitor 48 will, therefore, maintain the maximum value of voltage to it during the cycle of the waveform. For practical reasons, it is convenient to use an isolation amplifier 40 of unity gain to isolate the source of the input signal from the diode capacitor circuit. Once the maximum positive and negative excursions of the individual waveforms have been stored in the respective capacitors 48 and 50, their difference can be readily obtained through a standard summing circuit 52 and provided as an additional output. When a circuit of this nature is to be used repetitively, it is necessary to reinitialize the voltage of the capacitors 48 and 50 at an extreme value so that it can be recharged to the maximum or minimum as required. This is represented in FIG. 4 by a reset relay 54 which connects the two capacitors 48 and 50 to respective high-voltage power supplies 56 and 58 of the proper polarities. In practice, electronic switching means of higher speed would also be suitable for this reinitialization function.

Figure 5:
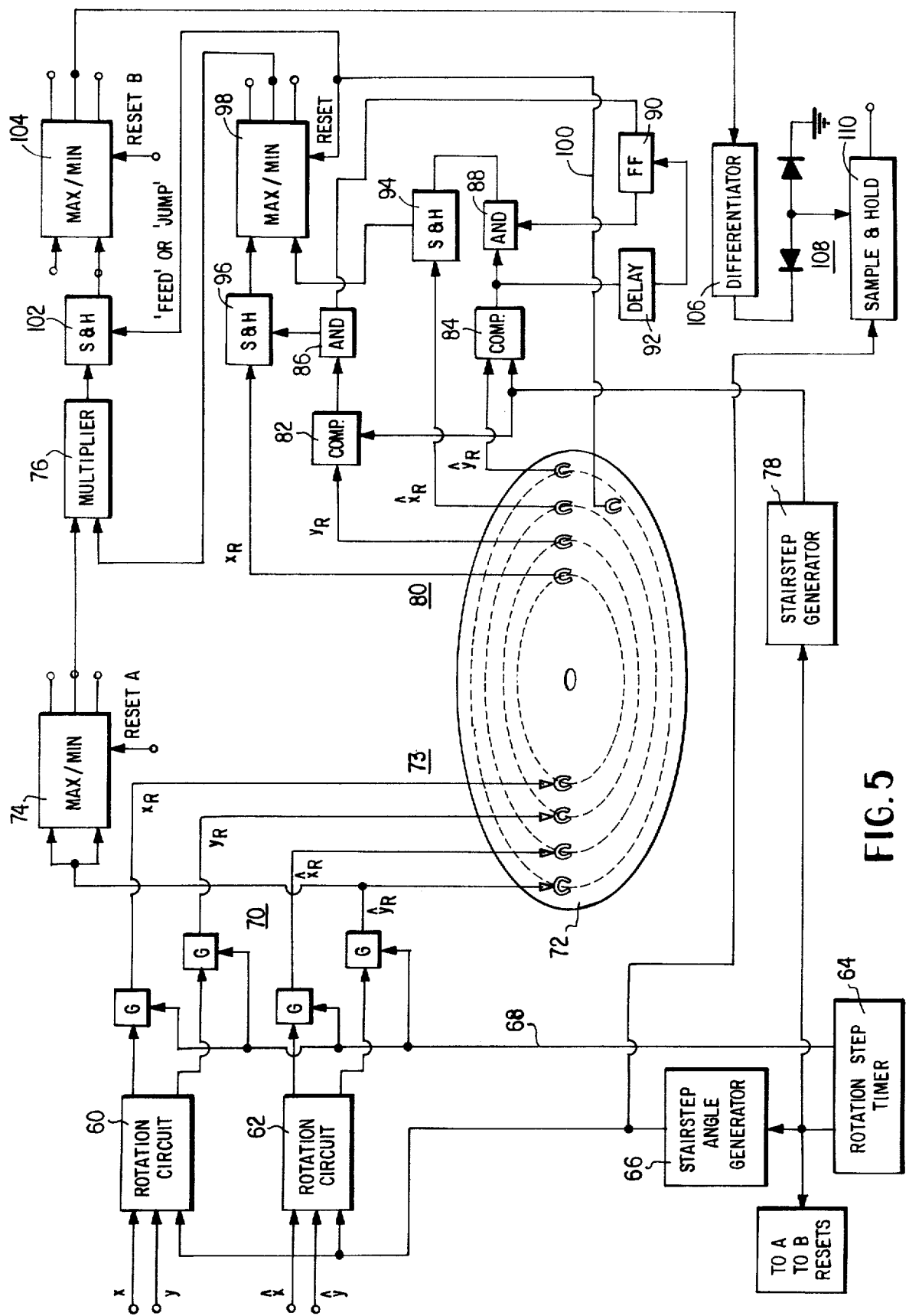
FIG. 5 is a block diagram of illustrative circuitry for measuring optimum layout angle, feed, and area.

The overall process of automatically determining the optimal angle of rotation for the layout can be understood now with reference to FIG. 5. The overall purpose of the circuitry and apparatus of FIG. 5 is to rotate both the original flat outline signal and the envelope signal through a sequence of angles which may vary over all possible angles, or over some restricted range. As this occurs, the maximum $\hat{Y}$ coordinate and the minimum $\hat{Y}$ coordinate of the envelope are determined to find the instantaneous height of a strip necessary to accommodate the part at that particular angle of rotation. At the same time, another portion of FIG. 5 is executing a repetitive scan of the original and envelope outline in order to determine the value of the maximum difference between the horizontal coordinate of the original and envelope signals. This value, which is represented in FIG. 6 as a horizontal line between the two points labeled A and B, represents the jump or feed appropriate to the part at that particular angle of rotation. Additional portions of FIG. 5 determine and store the value of the angle for which the product of the height and the feed is at a minimum value, namely the angle of optimum layout.

To consider the operation of the mechanism of FIG. 5 in detail, first consider two sets of signals which have been processed through mechanism described earlier in FIG. 2. These are respectively the original outline signal, represented by X and Y, and the envelope signal, represented by $\hat{X}$ and $\hat{Y}$. These signals are applied to identical rotation circuits 60 and 62, each of which is shown in FIG. 3. A master timer, 64, is used to incrementally step the angle used for rotation through a sequence of values appropriate to the particular situation for which the part will be used. Often there are no restrictions on the orientation and it is worthwhile to consider all orientations between 0 and 180°. (Note that rotation of 180° amounts to turning the parts around and does not affect the relationship of the parts. Therefore, it is not necessary to test in increments over a range of 360°.) But there are many cases in which the orientation is restricted to a given range of angles. This may be due to a variety of causes. One example in the field of metalworking is a restriction due to a subsequent operation involving bending of the metal part. The axis of the bend in some hard metal parts must be perpendicular to the grain direction of the metal within a small restricted angle of rotation. Another case would occur in the blanking of various materials where the direction of the part must not deviate from a given angle by more than a small restricted range due to some decorative pattern on the part, or some other non-isotropic property which must bear a given relation to the shape of the part. This can be preset before the operation of the mechanism.

The master timer 64 causes the incrementing of the value of angle produced by a stairstep angle generator 66 and also generates synchronizing and gating pulses which are used for other purposes. The fineness or closeness of the various incremental angle changes produced by the generator 66 are present according to the accuracy requirement and capability of the eventual machinery to be used for the final blanking or cutting of the piecepart.

For each given angle of rotation, the rotation step time 64 also generates a gating pulse on line 68 which is of sufficient duration to encompass one complete scan of both the original and envelope outlines, and this signal is applied to a series of gates generally indicated at 70. These gates allow the passage of one complete outline scan through them onto respective recording tracks of a recording disc 72 through the recording heads 73.

The use of a magnetic recording disc 72 is shown as a matter of convenience, but other means of recording the information could be utilized, including the quantization and discrete storage of the data, point by point, in a magnetic core memory of discrete cores. The purpose of recording this information is to permit the repetitive rescanning of the same signal without regard to a special synchronization of simultaneous X coordinates for the original and envelope signals.

At the same time that the single scan of the outlines is accomplished for purposes of recording, a max/min determination of the Y coordinate of the envelope is carried out by circuit 74 which has been reset before the beginning of the scan by a synchronizing pulse from the master step timer 64. The effect of the operation of this circuit, which has been described in detail in FIG. 4, is to produce a constant signal which represents the height of the envelope outline since it is connected to the difference output of the FIG. 4 circuit. This signal is applied to multiplier 76, where it is utilized in a manner which will be described in detail hereinafter.

Now that the outline signals are recorded on tracks and are available for a continual rescanning, a repetitive examination of these waveforms is carried out by additional portions of the circuitry. Their purpose is to scan through all the Y values, from the lowest to the highest occupied by the outline waveform, and at each Y value, to determine the maximum difference between the X value of the original and the envelope signal. This effect is achieved by using a slowly varying ramp signal produced by stairstep generator 78. The length of each step is equal to the time required to play back a recording of a complete scan of the outline signal. The height of each step is sufficient to insure a complete sampling of all Y values. In place of the stairstep generator may be used a ramp generator. This ramp generator is initiated by a synchronizing pulse from rotation step timer 64 (as is the stairstep generator), and the extreme voltages of the ramp having been preset to scan through the entire vertical range occupied by the part. The scan is very slow compared to the time required to play back a recording of a complete scan of the outline signal by the reading heads 80. Therefore, the ramp voltage may be considered to be effectively a uniform value during any individual scan of the outline signal.

As the outline signal is scanned, the Y coordinate signals from both the original and envelop outlines go to identical comparator gates 82 and 84. These comparator gates, which are widely used in the electronic circuit art, have an additional input from the stairstep generator 78. The output terminal of gates 82 and 84 will not carry any signal except at an instant when the values of the two input signals coincide in amplitude and polarity. Therefore, the pulse conducted from the comparator gates 82 and 84 to the AND gates 86 and 88 will occur at the instant when the Y value of the scan coordinate is equal to the instantaneous value of the stairstep voltage.

In order to insure that the distance AB, as shown in FIG. 6, is measured, toggle flip-flop 90 alternatively switches AND gates 86 and 88 so that the envelop outline is detected while scanning up the outline and the original contour outline is detected while scanning down. That is, when scanning up the outlines, toggle flip-flop 90 conditions AND gate 88 to detect the Y value of the envelop scan coordinate when it is equal to the value of the stairstep voltage. After this Y value has been detected, the flip-flop 90 is toggled by the output signal from delay line 92, the length of which is such as to insure that the Y value of the original contour signal is greater than the current stairstep value. If it were not greater the shorter distance between the envelop and original contour would be measured rather than the greater distance. After flip-flop 90 is toggled, AND gate 86 is conditioned to detect the Y value of the original contour scan coordinate when it is equal to the value of the stairstep voltage. Thus, when going up one side of the contour, the Y values will be increasing and the envelop Y value will be detected and, when going down the other side of the contour, the Y values will be decreasing and the original contour Y value will be detected. Since the length of each step is equal to a complete scan of the contour, the correct Y values for the envelop and original contour will be detected for each step.

At the respective instants when the Y values for the envelop and original contour are detected, the corresponding X values are respectively sampled by sample and hold circuits 94 and 96 are transferred to the max/min circuit 98, as shown in FIG. 4. This circuit, which is reset for each repetition of the scanned outline by a timing pulse pickup on line 100 from the recording disc 72, will have the effect of producing on its difference output, the maximum difference value for the X coordinates of the original and envelop signals at a given value of the Y coordinate. This maximum value represents the necessary feed or jump required for the horizontal translation of parts which are nested next to each other in a layout. This is shown pictorially in FIG. 6 by the horizontal line between the points labeled A and B.

The signal representing the feed or jump, emerging from max/min circuit 98 is applied to one of the inputs of multiplier 76 where it is multiplied with the height signal from max/min circuit 74. The resulting signal represents the area required for each part as a rectangle of a given feed width and height. This area includes the area of the part itself, as well as any scrap which may exist because the part is not purely rectangular in shape. The area signal is sampled at the end of each scan of the outline in sample and hold circuit 102 by the timing pulse applied to line 100.

This area signal itself will attain a minimum value for some specific angle of rotation corresponding to optimal layout. The remainder of the circuitry of FIG. 5 determines this minimum value by processing the area signal through the appropriate channel of a max/min circuit 104 as shown in FIG. 4. The derivative of this signal is then taken in a differentiator 106. A rectifier circuit generally indicated at 108 provides a signal whenever the area output decreases or becomes more negative. If the area output increases at any time, the positive derivative signal from the differentiator 106 will not be transmitted through rectifier circuit 108. Whenever the area signal decreases, the signal emerging from the rectifier circuit 108 will cause a sample and hold gate 110 to sample and hold the value of the angle then being produced by the stairstep generator 66. After the rotation step timer 64 has gone through its complete sequence of operations so as to increment the angle of rotation through the desired range, the output of the sample and hold gate, 110, will represent the most recent angle at which a decrease in the area signal has occurred. This is the angle of minimum area, or optimal utilization, for this particular part within the given angular range of rotation.

To clarify and further interpret the significance of some of the signals in FIG. 5, refer to FIG. 6. The diagram of the rotated part in FIG. 6A shows the original outline and the envelop, as well as a horizontal line between points A and B representing the feed signal. The X coordinates of A and B represents the two signals put into max/min circuit 98 of FIG. 5. The length of the line from A to B in FIG. 6 represents the signal emerging from circuit 98. The two points at the top and bottom of the envelop curve, represented by a dashed line in FIG. 6, are the maximum and minimum values of the trace of the envelop signal. These two signals are stored within the max/min circuit 74 of FIG. 5, and their difference, the height signal, emerges from the central terminal thereof. FIG. 6B illustrates how the actual optimal nesting of two adjacent parts would occur in the case of a piece having the shape of a circle with an arc-shaped notch taken from one edge.

As one additional illustration of the use of this invention, an illustration is given in FIG. 7 showing the application of the same technique, previously described, to a case in which parts will be produced with an alternate feed or in a multiple combination. This is a process which is frequently used in the metalworking industry, as well as many other industries, where it is known that two parts can be produced at one time by arranging them in different orientations, or where a part can be produced from one portion of a strip of material, and the scrap can be reversed and fed through the machinery a second time to produce a second sequence of parts nesting in the scrap area of the original piercings. Such parts are typically, though not necessarily, made by arranging alternate pieces at an angle of 180° to the adjacent interleaved parts. The same general approach applies to parts whose shape lend themselves to the manufacture of three at one time, four at one time, and so forth.

FIG. 7A shows how two T-shaped parts have been nested together, one of which has been rotated at an angle of 180°. Points W and X on the two outlines can be connected, as well as points Y and Z, to produce a single outline representing the combination of the two T-shaped parts. This overall outline can be treated in precisely the way as the outline of an actual single part by means of the invention already described. Therefore, an envelop of the shaped sketched in FIG. 7A will be produced for purposes of orienting the combination of the two T-shaped parts for the optimal utilization of the material.

FIG. 7B shows the result of such a process carried out for the two T-shaped parts, in addition to indicating the feed and height as was done in FIG. 6. Furthermore, the outline of the strip of material from which the parts would be manufactured is shown schematically, illustrating how the top and bottom of the strip would line up with the top and bottommost points of the envelop outline.

It is possible to construct tools for the purpose of stamping out both T-shaped parts in one pass of the material strip through the tool. This is what is meant by the phrase, 'two at a time.' Alternatively, it is possible to construct a tool for the purpose of blanking only a single part, that labeled with a 1 in FIG. 7B, from a strip of the width indicated in FIG. 7B. After this process had been completed, the scrap material would be turned end-for-end and fed through the tool an additional pass, at which time the parts, labeled 2 in FIG. 7B, would be blanked from the remainder of the material.

Although provisions for resetting circuits at the end of certain repetitive cycles of operation have been illustrated and described for certain circuits hereinbefore, it is to be understood that where not illustrated and described, the provision of such means would be within the skill of one engaged in these arts.

Further, it is to be understood that the various delay means described hereinbefore could be by recording-playback means or digitizing-digital store means. Further, in fact, the entirety of the operations described hereinbefore can be implemented in a program run on a digital general purpose computer.

Numerous modifications of the invention will become apparent to one of ordinary skill in the art upon reading the foregoing disclosure. During such a reading it will be evident that this invention provides unique method and apparatus for automatically optimizing the orientation of shapes to be cut from material for accomplishing the objects and advantages herein stated.

What is claimed is:

1. Apparatus for automatically orienting objects of predetermined geometrical shape upon sheet material, the outline of said shape being represented by object contour signals corresponding to the co-ordinate location of representative points on said outline, said apparatus comprising:

signal generating means responsive to said object contour signals for generating envelop signals which correspond to a contour which differs from at least portions of the object contour by a predetermined amount; and calculating means responsive to said object contour and said envelop signals for determining the orientation of said object which corresponds to optimal efficiency in utilization of said sheet material.

2. Apparatus as in claim 1 where said calculating means includes means for determining the angle at which the optimum efficiency orientation occurs.

3. Apparatus as in claim 1 where said object contour signals and said envelop signals are electrical signals.

4. Apparatus as in claim 1 where the envelop is outside of the object contour.

5. Apparatus as in claim 1 where the envelop is inside of the object contour.

6. Apparatus as in claim 1 where said calculating means includes means for rotating said object contour and said envelop signals through a predetermined angle of rotation in a plurality of angular increments to thereby generate rotated object contour and envelop signals;

height calculating means responsive to the rotated envelop signals for determining the height of the rotated envelop at each of said angular increments;

jump calculating means responsive to the rotated object contour and envelop signals for determining the maximum horizontal distance between the rotated object contour and envelop therefore at each of said angular increments; and optimum orientation calculating means responsive to the output signals from said height calculating means and said jump calculating means for determining the said orientation of the object which corresponds to optimum efficiency in utilization of said sheet material.

7. Apparatus as in claim 6 where said predetermined angle of rotation is 360°.

8. Apparatus as in claim 6 where said jump calculating means includes means for storing said rotated object contour and envelop signals at each of said angular increments;

sampling means responsive to said stored signals for sampling the horizontal distance between the rotated object contour and the envelop at successive selected vertically displaced points along the vertical dimension of said object at each of said angular increments; and first detecting means responsive to the output signals from said sampling means for detecting the same maximum horizontal distance between the rotated object contour and envelop therefor at each of said angular increments.

9. Apparatus as in claim 6 where said optimum orientation calculating means includes multiplying means for multiplying said output signals from said height calculating means and said jump calculating means to form an area signal at each of said angular increments; and second detecting means responsive to said area signals to determine the minimum area signal at all of said angular increments to thereby determine the said orientation of the object which corresponds to optimum efficiency in utilization of said sheet material.

10. Apparatus as in claim 6
where said rotating means includes angle signal generating means for generating a succession of angle signals respectively corresponding to said plurality of angular increments; and where said calculating means includes means responsive to the output signals from said optimum orientation calculating means for storing the angular increment corresponding to the optimum efficiency orientation.

11. Apparatus as in claim 1 where said object contour signals are indicative of the Cartesian co-ordinates of representative points along said shape outline, said object contour signals including a first set of signals corresponding to the abscissas of said points and a second set of signals corresponding to the ordinates of said points.

12. Apparatus as in claim 11 where said signal generating means includes first and second differentiating means for respectively differentiating with respect to time said first and second sets of signals;

first processing means for combining said first set of signals and the output signals from said second differentiating means; and second processing means for combining said second set of signals and the output signals from said first differentiating means whereby the output signals from said first processing means correspond to the abscissas of representative points along the envelop contour and the output signals from said second processing means correspond to the ordinates of representative points along said envelop contour.

13. Apparatus as in claim 12 where said first and second processing means respectively include means for adding the signals applied thereto to form envelop signals corresponding to an envelop larger than the object contour.

14. Apparatus as in claim 12 where said first processing means includes means for subtracting the output signals from said second dividing means from said first set of signals and said second processing means includes means for subtracting the output signals from said first dividing means from said second set of signals to form envelop signals corresponding to an envelop smaller than the object contour.

15. Apparatus as in claim 12 where said signal generating means includes first and second scaling means for respectively scaling the output signals from said first and second differentiating means.

16. Apparatus as in claim 12 where said signal generating means includes first and second squaring means for respectively squaring the output signals from said first and second differentiating means;

summing means for summing the output signals from said first and second squaring means;

square rooting means for taking the square root of the output signal from said summing means;

first and second dividing means for respectively dividing the output signals from said first and second differentiating means by the output signal from said square rooting means;

where said first processing means combines said first set of signals and the output signals from said second dividing means; and where said second processing means combines said second set of signals and the output signals from said first dividing means whereby the output signals from said first processing means correspond to the abscissas of representative points along the envelop contour and the output signals from said second processing means correspond to the ordinates of representative points along said envelop contour.

17. Apparatus as in claim 16 where said first and second processing means respectively include means for adding the signals applied thereto to form envelop signals corresponding to an envelop larger than the object contour.

18. Apparatus as in claim 16 where said first processing means includes means for subtracting the output signals from said second dividing means from said first set of signals and said second processing means includes means for subtracting the output signals from said first dividing means from said second set of signals to form envelop signals corresponding to an envelop smaller than the object contour.

19. Apparatus as in claim 16 where said signal generating means includes first and second scaling means for respectively scaling the output signals from said first and second dividing means.

20. Apparatus as in claim 1 including further signal generating means responsive to said object contour signals for replacing those signals corresponding to sharp corners in said object contour with replacement signals which cause said envelop signals to be a substantially equal distance from the nearest point on said object contour signals at all places.

21. Apparatus as in claim 20 where said further signal generating means includes detecting means responsive to said object contour signals for detecting the presence of sharp corners in said object contour signals;

calculating means responsive to said detecting means and said object contour signals for determining the extent of said replacement signals and the exact point at which said replacement signals should be inserted into said object contour signals; and replacement signal generating means responsive to said calculating means for generating said replacement signals and inserting them into said object contour signals.

22. Apparatus as in claim 21 where said object contour signals are indicative of the Cartesian coordinates of representative points along said shape outline, said object contour signals including a first set of signals corresponding to the abscissas of said points and a second set of signals corresponding to the ordinates of said points.

23. Apparatus as in claim 22 where said detecting means includes first and second differentiating means for respectively differentiating with respect to time said first and second set of signals;

first and second delay means respectively responsive to said first and second differentiating means for respectively delaying the output signals from said first and second differentiating means by an amount of time at least as long as the amount required to scan said sharp corners;

first multiplying means for multiplying the output signals from said first differentiating means and said second delay means;

second multiplying means for multiplying the output signals from said second differentiating means and said first delay means; and processing means for combining the output signal from said first multiplying means with the output signal from said second multiplying means to derive a curvature signal representative of the curvature of said object contour.

24. Apparatus as in claim 23 where said processing means includes summing means for subtracting the output signal from said first multiplying means from the output signal from said second multiplying means so that said curvature signal indicates the presence of an external corner in said object contour.

25. A method for automatically orienting objects of predetermined geometrical shape upon sheet material, the outline of said shape being represented by electrical object contour signals corresponding to the coordinate location of representative points on said outline, said method comprising the steps of:

generating, in response to said object contour signals, electrical envelop signals which correspond to a contour which differs from at least a portion of the object contour by a predetermined amount; and calculating, in response to said object contour and said envelope signals, the orientation of said object which corresponds to optimal efficiency in utilization of said sheet material.

26. A method as in claim 25 where calculating steps include the step of determining the angle at which the optimum efficiency orientation occurs.

27. A method as in claim 25 where said object contour signals and said envelop signals are analog electrical signals.

28. A method as in claim 25 where the envelop is outside of the object contour.

29. A method as in claim 25 where the envelop is inside of the object contour.

30. A method as in claim 25 where said calculating step includes the steps of:

rotating said object contour and said envelop signals through a predetermined range of orientation angles to thereby generate rotated object contour and envelop signals;

determining, in response to the rotated envelop signals, the height of the rotated envelop at each of said angular increments;

determining, in response to the rotated object contour and envelop signals, the maximum horizontal distance between the rotated contour and envelop therefor at each of said angular increments; and determining, in response to the output signals from said vertical height calculating step and said maximum horizontal distance calculating step, the said orientation of the object which corresponds to optimum efficiency in utilization of said sheet material.

31. A method as in claim 30 where said predetermined range of orientation angles is a full 180°.

32. A method as in claim 25 where said object contour signals are indicative of the Cartesian coordinates of representative points along said shape outline, said object contour signals including a first set of signals corresponding to the abscissas of said points and a second set of signals corresponding to the ordinates of said points.

33. A method as in claim 32 where said signal generating step includes first and second differentiating steps for respectively differentiating with respect to time said first and second sets of signals;

a first combining step including combining said first set of signals and the output signals from said second differentiating step to obtain output signals which correspond to the abscissas of representative points along the envelop contour; and a second combining step including combining said second set of signals and the output signals from said first differentiating step to obtain output signals which correspond to the ordinates of representative points along said envelop contour.

34. A method as in claim 33 where each said combining steps respectively includes a step of adding the signals combined thereat to form envelop signals corresponding to an envelop larger than the object contour.

35. A method as in claim 33 where said first combining step includes a step of subtracting the output signals from said second dividing step from said first set of signals and said second combining step includes a step of subtracting the output signals from said first dividing step from said second set of signals to form envelop signals corresponding to an envelop smaller than the object contour.

36. A method as in claim 33 where said signal generating step includes first and second scaling steps for respectively scaling the output signals from said first and second differentiating steps.

37. A method as in claim 33 where said signal generating step includes first and second squaring steps for respectively squaring the output signals from said first and second differentiating steps;

summing the output signals from said first and second squaring steps;

taking the square root of the output signal from the summing step;

first and second dividing steps for respectively dividing the output signals from said first and second differentiating steps by the output signals from the square rooting step;

where said first combining step includes combining said first set of signals and the output signals from said second dividing step to obtain output signals which correspond to the abscissas of representative points along the envelop contour; and where said second combining step includes combining said second set of signals and the output signals from said first dividing step to obtain output signals which correspond to the ordinates of representative points along said envelop contour.

38. A method as in claim 37 where each said combining steps respectively includes a step of adding the signals combined thereat to form envelop signals corresponding to an envelop larger than the object contour.

39. A method as in claim 37 where said first combining step includes a step of subtracting the output signals from said second dividing step from said first set of signals and said second combining step includes a step of subtracting the output signals from said first dividing step from said second set of signals to form envelop signals corresponding to an envelop smaller than the object contour.

40. A method as in claim 37 where said signal generating step includes first and second scaling steps for respectively scaling the output signals from said first and second dividing steps.

41. A method as in claim 25 including a further signal generating step responsive to said object contour signals for replacing those signals corresponding to sharp corners in said object contour with replacement signals which cause said envelop signals to be a substantially equal distance from the nearest point on said object contour signals at all places.

42. A method as in claim 41 where said further signal generating step includes the steps of
detecting, in response to said object contour signals, the presence of sharp corners in said object contour signals;
determining, in response to said detecting step, the duration of said replacement signals and the exact time at which said replacement signals should be inserted into said object contour signals; and
generating, in response to said determining step, said replacement signals and inserting them into said object contour signals.

43. A method as in claim 42 where said object contour signals are indicative of the Cartesian coordinates of representative points along said shape outline, said object contour signals including a first set of signals corresponding to the abscissas of said points and a second set of signals corresponding to the ordinates of said points.

44. A method as in claim 43 where said detecting step includes the steps of
first and second differentiating steps for respectively differentiating with respect to time said first and second set of signals;
first and second delay steps respectively responsive to said first and second differentiating steps for respectively delaying the output signals from said first and second differentiating steps by an amount of time at least as long as the amount required to scan said sharp corners;
a first multiplying step for multiplying the output signals from said first differentiating step and said second delay step;
a second multiplying step for multiplying the output signals from said second differentiating step and said first delay step; and
a processing step for combining the output signal from said first multiplying step with the output signal from said second multiplying step to derive a curvature signal representative of the curvature of said object contour.

45. A method as in claim 44 where said processing step includes a summing step for subtracting the output signal from said first multiplying step from the output signal from said second multiplying step so that said curvature signal indicates the presence of an external corner in said object contour.

46. A method as in claim 25 where said sheet material comprises sheet metal and said predetermined geometricall shape comprises a part to be blanked out from said sheet metal.

* * * * *